United States Patent
Liu et al.

(10) Patent No.: US 7,572,329 B2
(45) Date of Patent: Aug. 11, 2009

(54) METHOD OF MAKING A GYPSUM SLURRY WITH MODIFIERS AND DISPERSANTS

(75) Inventors: Qingxia Liu, Vernon Hills, IL (US); David R. Blackburn, Barrington, IL (US); Michael P. Shake, Johnsburg, IL (US); Brian Randall, Fairview, OK (US); John W. Wilson, Fairview, OK (US); Dennis M. Lettkeman, Watonga, OK (US)

(73) Assignee: United States Gypsum Company, Chicago, IL (US)

( * ) Notice: Subject to any disclaimer, the term of this patent is extended or adjusted under 35 U.S.C. 154(b) by 159 days.

(21) Appl. No.: 11/450,086

(22) Filed: Jun. 9, 2006

(65) Prior Publication Data
US 2006/0278135 A1 Dec. 14, 2006

Related U.S. Application Data

(63) Continuation-in-part of application No. 11/152,323, filed on Jun. 14, 2005, now abandoned.

(51) Int. Cl.
*C04B 11/00* (2006.01)
(52) U.S. Cl. .............................. 106/778; 524/4; 524/5; 264/333
(58) Field of Classification Search .................. 106/778; 264/333; 524/4, 5
See application file for complete search history.

(56) References Cited

U.S. PATENT DOCUMENTS

| | | | |
|---|---|---|---|
| 4,028,125 A | 6/1977 | Martin | |
| 4,202,857 A | 5/1980 | Lowe | |
| 4,238,239 A | 12/1980 | Brown | |
| 4,341,560 A | 7/1982 | Saito et al. | |
| 4,561,986 A | 12/1985 | Villa et al. | |
| 4,666,971 A | 5/1987 | Greenhalgh | |
| 4,814,014 A | 3/1989 | Arfaei | |
| 4,927,463 A | 5/1990 | Kloetzer et al. | |
| 4,960,465 A | 10/1990 | Arfaei | |
| 5,109,030 A | 4/1992 | Chao et al. | |
| 5,118,751 A | 6/1992 | Schulze et al. | |
| 5,223,036 A | 6/1993 | Koyata et al. | |
| 5,286,412 A * | 2/1994 | Northey et al. | |
| 5,362,323 A | 11/1994 | Koyata et al. | |
| 5,369,198 A | 11/1994 | Albrecht et al. | |
| 5,387,626 A | 2/1995 | Bohme-Kovac et al. | |
| 5,393,343 A | 2/1995 | Darwin et al. | |
| 5,401,798 A | 3/1995 | Rasp et al. | |
| 5,424,099 A | 6/1995 | Stewart et al. | |
| 5,556,460 A | 9/1996 | Berke et al. | |
| 5,614,017 A | 3/1997 | Shawl | |
| 5,643,978 A | 7/1997 | Darwin et al. | |
| 5,661,206 A | 8/1997 | Tanaka et al. | |
| 5,670,578 A | 9/1997 | Shawl | |
| 5,685,903 A | 11/1997 | Stav et al. | |
| 5,703,174 A | 12/1997 | Arfaei et al. | |
| 5,725,656 A | 3/1998 | Shimanovich et al. | |
| 5,725,657 A | 3/1998 | Darwin et al. | |
| 5,739,212 A | 4/1998 | Wutz et al. | |
| 5,779,786 A | 7/1998 | Patel | |
| 5,798,425 A | 8/1998 | Albrecht et al. | |
| 5,834,576 A | 11/1998 | Nagano et al. | |
| 5,858,083 A | 1/1999 | Stav et al. | |
| 5,925,184 A | 7/1999 | Hirata et al. | |
| 5,985,989 A | 11/1999 | Shawl et al. | |
| 6,034,208 A | 3/2000 | McDaniel et al. | |
| 6,043,329 A | 3/2000 | Lepori et al. | |
| 6,150,437 A | 11/2000 | Wutz et al. | |
| 6,166,112 A | 12/2000 | Hirata et al. | |
| 6,187,887 B1 | 2/2001 | Albrecht et al. | |
| 6,211,317 B1 | 4/2001 | Albrecht et al. | |
| 6,264,739 B1 | 7/2001 | Yamoto et al. | |
| 6,281,307 B1 | 8/2001 | Muhlebach et al. | |
| 6,294,015 B1 | 9/2001 | Yamashita et al. | |
| 6,376,581 B1 | 4/2002 | Tanaka et al. | |
| 6,527,850 B2 | 3/2003 | Schwartz et al. | |
| 6,620,879 B1 | 9/2003 | Albrecht et al. | |
| 6,800,129 B2 | 10/2004 | Jardine et al. | |

(Continued)

FOREIGN PATENT DOCUMENTS

| | | |
|---|---|---|
| EP | 0644165 | 3/1995 |
| EP | 0725044 | 8/1996 |
| JP | 56045857 | 4/1981 |
| JP | 59025876 | 2/1984 |
| JP | 61040861 | 2/1986 |
| WO | WO 9533698 | 12/1995 |
| WO | WO 0181263 | 11/2001 |
| WO | WO 03/082765 | 10/2003 |
| WO | WO 03/082766 | 10/2003 |

*Primary Examiner*—Paul Marcantoni
(74) *Attorney, Agent, or Firm*—Greer, Burns & Crain, Ltd.; David F. Janci, Esq.; Pradip Sahu, Esq.

(57) ABSTRACT

In a method of making a gypsum slurry, a polycarboxylate dispersant, a modifier and a hydraulic material comprising stucco are selected for use in the slurry. These components are then combined with water to form a slurry, where the modifier is added to the slurry prior to formation of a slurry phase by the water, the stucco and the dispersant. The modifier has been shown to be less effective when added after the dispersant and stucco have been contacted in an aqueous slurry. In a preferred embodiment, an amount of stucco is obtained and the modifier and dispersant are selected. A predissolved solution of a dispersant and modifier is prepared in water to form a solution prior to the addition of the stucco. After mixing the solution, the stucco is added to form the slurry. Optionally, the slurry is then shaped into a product and allowed to set.

18 Claims, No Drawings

U.S. PATENT DOCUMENTS

| | | |
|---|---|---|
| 6,852,159 B2 | 2/2005 | Kinoshita et al. |
| 6,929,875 B2 * | 8/2005 | Savoly et al. |
| 2003/0019401 A1 | 1/2003 | Schwartz et al. |
| 2003/0127026 A1 | 7/2003 | Anderson et al. |
| 2003/0167973 A1 | 9/2003 | Peev et al. |
| 2004/0045481 A1 | 3/2004 | Sethuraman et al. |
| 2004/0072939 A1 | 4/2004 | Cornman et al. |
| 2004/0149172 A1 | 8/2004 | Jardine et al. |
| 2004/0149174 A1 | 8/2004 | Farrington et al. |
| 2004/0170873 A1 | 9/2004 | Smith |
| 2004/0198873 A1 | 10/2004 | Bury et al. |
| 2004/0211342 A1 | 10/2004 | Sprouts et al. |
| 2005/0045069 A1 | 3/2005 | McCarthy et al. |
| 2006/0278134 A1 * | 12/2006 | Lettkeman et al. |
| 2006/0280899 A1 * | 12/2006 | Liu et al. ............ 428/70 |
| 2008/0009565 A1 * | 1/2008 | Wittbold et al. |
| 2008/0148997 A1 * | 6/2008 | Blackburn et al. ...... 106/708 |

* cited by examiner

METHOD OF MAKING A GYPSUM SLURRY WITH MODIFIERS AND DISPERSANTS

CROSS REFERENCES TO RELATED APPLICATIONS

This application is a continuation-in-part of U.S. Ser. No. 11/152,323, filed Jun. 14, 2005, now abandoned, entitled "Method of Making a Gypsum Slurry with Modifiers and Dispersants", herein incorporated by reference.

This application is related to co-pending U.S. Ser. No. 11/152.661, entitled "Fast Drying Wallboard"; U.S. Ser. No. 11/152,418, entitled "Gypsum Products Utilizing a Two-Repeating Unit Dispersant and Process for Making Them"; U.S. Ser. No. 11/152,317, entitled "Modifiers for Gypsum Products and Methods of Using Them" and U.S. Ser. No. 11/152,404, entitled, "Effective Use of Dispersants in Wallboard Containing Foam", all filed Jun. 14, 2005 and all hereby incorporated by reference.

This application is related to co-pending U.S. Ser. No. 11/449,924, entitled "Gypsum Products Utilizing a Two-Repeating Unit Dispersant and Process for Making Them"; U.S. Ser. No. 11/450,068, entitled "Modifiers for Gypsum Slurries and Methods of Using Them" and U.S. Ser. No. 11/450,122, entitled, "Effective Use of Dispersants in Wallboard Containing Foam", all filed concurrently herewith and all hereby incorporated by reference.

BACKGROUND OF THE INVENTION

This invention relates to a method for making gypsum products using a modifier and a polycarboxylate dispersant. More specifically, it relates to the making of a gypsum slurry and a gypsum panel that adds the dispersant and modifier in a specific sequence.

Gypsum-based building products are commonly used in construction. A gypsum panel made of gypsum is fire retardant and can be used in the construction of walls of almost any shape. It is used primarily as an interior wall and ceiling product. Gypsum has sound-deadening properties. It is relatively easily patched or replaced if it becomes damaged. There are a variety of decorative finishes that can be applied to the gypsum panel, including paint and wallpaper. Even with all of these advantages, it is still a relatively inexpensive building material.

One reason for the reasonable cost of gypsum panels is that they are manufactured by a process that is fast and efficient. A slurry, including calcium sulfate hemihydrate and water, is used to form the core, and is continuously deposited on a paper cover sheet moving beneath a mixer. A second paper cover sheet is applied thereover and the resultant assembly is formed into the shape of a panel. Calcium sulfate hemihydrate reacts with a sufficient amount of the water to convert the hemihydrate into a matrix of interlocking calcium sulfate dihydrate crystals, causing it to set and to become firm. The continuous strip thus formed is conveyed on a belt until the calcined gypsum is set, and the strip is thereafter cut to form boards of desired length, which boards are conveyed through a drying kiln to remove excess moisture. Since each of these steps takes only minutes, small changes in any of the process steps can lead to gross inefficiencies in the manufacturing process.

The amount of water added to form the slurry is in excess of that needed to complete the hydration reactions. Some of the water that is added to the gypsum slurry is used to hydrate the calcined gypsum, also known as calcium sulfate hemihydrate, to form an interlocking matrix of calcium sulfate dihydrate crystals. Excess water gives the slurry sufficient fluidity to flow out of the mixer and into the facing material to be shaped to an appropriate width and thickness. While the product is wet, it is very heavy to move and relatively fragile. The excess water is removed from the board by evaporation. If the excess water were allowed to evaporate at room temperature, it would take a great deal of space to stack and store the gypsum panel while it was allowed to air dry or to have a conveyor long enough to provide adequate drying time. Until the board is set and relatively dry, it is somewhat fragile, so it must be protected from being crushed or damaged.

To dry the boards in a relatively short period of time, the gypsum panel product is usually dried by evaporating the extra water at elevated temperatures, for example, in an oven or kiln. It is relatively expensive to build and operate the kiln at elevated temperatures, particularly when the cost of fossil fuel rises. A reduction in production costs could be realized by reducing the amount of excess water present in set gypsum boards that is later removed by evaporation.

Another reason to decrease water is that the strength of gypsum products is inversely proportional to the amount of water used in the manufacturing of full density products. As the excess water evaporates, it leaves voids in the matrix once occupied by the water. Where large amounts of water were used to fluidize the gypsum slurry, more and larger voids remain in the product when it is completely dry. These voids decrease the product density and strength in a finished product such as poured flooring.

Dispersants used with gypsum help fluidize the mixture of water and calcium sulfate hemihydrate so that less water is needed to make a flowable slurry. Naphthalene sulfonate dispersants are well known, but have limited efficacy. Polycarboxylate dispersants are commonly used with cements and, to a lesser degree, with gypsum. The class of compounds represented by the term "polycarboxylate dispersants" is huge, and it is very difficult to predict how individual compounds react in different media.

Modifiers can be added to a gypsum slurry to increase the efficacy of the dispersant. Salts, including silicates and carbonates, are particularly effective modifiers. More specifically, quicklime, lime and soda ash are especially effective with polycarboxylic ether dispersants. Modifiers are disclosed in greater detail in copending U.S. Ser. No. 11/152,317, entitled, "Modifiers for Gypsum Products and Methods of Using Them", previously incorporated by reference.

It has been found, however, that the methods used to make mixtures of gypsum, dispersants and modifiers do not consistently produce highly fluid slurries. In some instances, the efficacy of the dispersant is dramatically increased, but in other cases, the same combination of components had little effect on the fluidity of the slurry. This inability to predict the fluidity of the slurry can lead to increased dispersant use to ensure that a minimum fluidity is achieved. In a process where the dispersant can be one of the most expensive components, dispersant overdose unnecessarily increases the product cost at a rapid rate.

Another property of polycarboxylate dispersants is their tendency to retard the set of a gypsum slurry. If high doses of dispersants are used to accommodate uncertain dispersant efficacy, set may be retarded to the degree where certain products, such as the gypsum panel, cannot be produced on current, high-speed equipment.

Thus, there is a need for a method to make a gypsum slurry, and products therewith, that consistently generate a highly fluid mixture without excessive dosages of dispersants. Use of such a method would keep the cost reasonable where expensive dispersants were used, and would minimize set retardation of the slurry.

SUMMARY OF THE INVENTION

Solutions to these and other problems are met by the current method which consistently produces a highly fluid slurry from gypsum, a dispersant and a modifier.

More specifically, in a method of making a gypsum slurry, a polycarboxylate dispersant, a modifier and a hydraulic material comprising stucco are selected for use in the slurry. These components are then combined with water to form a slurry, where the modifier is added to the slurry prior to formation of a slurry phase by the water, the stucco and the dispersant. The modifier has been shown to be less effective when added after the dispersant and stucco have been contacted in an aqueous slurry.

In a preferred embodiment, an amount of stucco is obtained and the modifier and dispersant are selected. A predissolved solution of a dispersant and modifier is prepared in water to form a solution prior to the addition of the stucco. After mixing the solution, the stucco is added to form the slurry. Optionally, the slurry is then shaped into a product and allowed to set.

This method of combining the modifier, dispersant, stucco and water leads to consistency in using the modifier to its best advantage. If the slurry fluidity is consistent, there is less need to use high dosages of the dispersant to assure a mixture of sufficient fluidity to pour easily. Less product is lost that does not meet specifications. Reduced dispersant dosages lead to reduced dispersant cost and improved product set times.

DETAILED DESCRIPTION OF THE INVENTION

These and other problems are improved by the present invention that includes a method for making a slurry of water, a polycarboxylate dispersant, a modifier and calcium sulfate hemihydrate, by combining the components in a particular order. As is discussed in greater detail below, a modifier is an additive that enhances the efficacy of the dispersant.

It has been discovered that if the calcium sulfate hemihydrate, or stucco, is exposed to the dispersant before the modifier is exposed to the dispersant, then the modifier is rendered less effective. Preferably the modifier and the dispersant are both predissolved in the gauge water, forming a solution. In this case, the modifier and the dispersant are added in any order, either sequentially or essentially simultaneously. After the solution is formed, the stucco is mixed with the solution, exposing the stucco to both the dispersant and the modifier simultaneously.

In another embodiment, the modifier is mixed with a portion of the gauge water to form a modifier slurry. The modifier slurry is then mixed with the remaining gauge water and the dispersant, either simultaneously or sequentially, to form the three component solution. In either case, both the modifier and the dispersant are blended in the gauge water prior to introduction of the dry components.

If both the dispersant and the modifier are in dry or powdered form, in another preferred embodiment, the modifier and dispersant are combined with the stucco, then all of the dry components are added to the water at once. Alternately, the dispersant is added to the stucco to make a dispersant-stucco mixture, while the modifier is predissolved in the water. The dispersant-stucco mixture is then added to the predissolved modifier in the water. These embodiments are particularly advantageous where powdered dispersants are preferred.

As in the other embodiments, since the modifier and the dispersant are added at the same time, the dispersant has not had the opportunity to interact with the stucco in water prior to addition of the modifier.

The stucco, also known as calcium sulfate hemihydrate or calcined gypsum, in present amounts of at least 50% of the dry materials. Preferably, the amount of stucco is at least 80%. In many gypsum formulations, the dry component material is more than 90% or even 95% calcium sulfate hemihydrate. The method of calcination is not important, and either alpha or beta-calcined stucco is suitable. Use of calcium sulfate anhydrite and/or calcium sulfate dihydrate is also contemplated, although preferably in small amounts of less than 20%.

Stuccos from different sources include different amounts and types of salts and impurities. The slurry of this invention is most effective when calcium sulfate hemihydrate has small concentrations of naturally occurring salts. Low-salt stuccos are defined as those having soluble salts of less than 300 parts per million. High salt content stuccos that include those having at least 600 parts per million soluble salts are most likely to interfere with the action of the modifier. Stuccos such as those in deposits found in Southard, Okla., Little Narrows, Nova Scotia, Fort Dodge, Iowa, Sweetwater, Tex., Plaster City, Calif. or many other locations are suitable for use with this slurry.

In some embodiments of the invention, additives are included in the gypsum slurry to modify one or more properties of the final product. Additives are used in the manner and amounts as are known in the art. Frequently these and other additives are in solid, powder or granular form and are added to the dry components before the slurry is mixed. Concentrations are reported in amounts per 1000 square feet of finished board panels ("MSF").

Additional additives are also added to the slurry as are typical for the particular application to which the gypsum slurry will be put. Set retarders (up to about 2 lb./MSF (9.8 g/m2)) or dry accelerators (up to about 35 lb./MSF (170 g/m2)) are added to modify the rate at which the hydration reactions take place. "CSA" is a set accelerator comprising 95% calcium sulfate dihydrate co-ground with 5% sugar and heated to 250° F. (121° C.) to caramelize the sugar. CSA is available from USG Corporation, Southard, Okla. plant, and is made according to U.S. Pat. No. 3,573,947, herein incorporated by reference. Potassium sulfate is another preferred accelerator. HRA is calcium sulfate dihydrate freshly ground with sugar at a ratio of about 5 to 25 pounds of sugar per 100 pounds of calcium sulfate dihydrate. It is further described in U.S. Pat. No. 2,078,199, herein incorporated by reference. Both of these are preferred accelerators.

Another accelerator, known as wet gypsum accelerator, is also a preferred accelerator. A description of the use of and a method for making wet gypsum accelerator are disclosed in U.S. Pat. No. 6,409,825, herein incorporated by reference. This accelerator includes at least one additive selected from the group consisting of an organic phosphonic compound, a phosphate-containing compound or mixtures thereof. This particular accelerator exhibits substantial longevity and maintains its effectiveness over time such that the wet gypsum accelerator can be made, stored, and even transported over long distances prior to use. The wet gypsum accelerator is used in amounts ranging from about 5 to about 80 pounds per thousand square feet (24.3 to 390 g/m$^2$) of board product.

Starches are used in amounts from about 3 to about 20 lbs./MSF (15.6 to 97.6 g/m$^2$) to increase bond strength and strengthen the product. Glass fibers are optionally added to the slurry in amounts of up to 11 lb./MSF (54 g/m$^2$). Up to 11 lb./MSF (53.7 g/m²) of paper fibers are also added to the slurry. Wax emulsions are added to the gypsum slurry in amounts up to 90 lb./MSF (439 g/m²) to improve the water-resistency of the finished gypsum board panel.

In embodiments of the invention that employ a foaming agent to yield voids in the set gypsum-containing product to provide lighter weight, any of the conventional foaming agents known to be useful in preparing foamed set gypsum products can be employed. Many such foaming agents are well known and readily available commercially, e.g. the HYONIC line of soap products from GEO Specialty Chemicals, Ambler, Pa. Foams and a preferred method for preparing foamed gypsum products are disclosed in U.S. Pat. No. 5,683,635, herein incorporated by reference. If foam is added to the product, the polycarboxylate dispersant is optionally divided between the process water and the foam water prior to its addition to the calcium sulfate hemihydrate. This preferred method of combining stucco, modifiers and dispersants is disclosed in U.S. Ser. No. 11/152,404, entitled, "Method of Controlling Core Properties in Wallboard", previously incorporated by reference.

A trimetaphosphate compound is added to the gypsum slurry in some embodiments to enhance the strength of the product and to reduce sag resistance of the set gypsum. Preferably the concentration of the trimetaphosphate compound is from about 0.07% to about 2.0% based on the weight of the calcined gypsum. Gypsum compositions including trimetaphosphate compounds are disclosed in U.S. Pat. No. 6,342,284 and 6,632,550, both herein incorporated by reference. Exemplary trimetaphosphate salts include sodium, potassium or lithium salts of trimetaphosphate, such as those available from Astaris, LLC., St. Louis, MO. Care must be exercised when using trimetaphosphate with lime or other modifiers that raise the pH of the slurry. Above a pH of about 9.5, the trimetaphosphate loses its ability to strengthen the product and the slurry becomes severely retardive.

Other potential additives to the gypsum panel are biocides to reduce growth of mold, mildew or fungi. Depending on the biocide selected and the intended use for the gypsum panel, the biocide can be added to the facing, the gypsum core or both. Examples of biocides include boric acid, pyrithione salts and copper salts. Biocides can be added to either the facing or the gypsum core. When used, biocides are used in the facings in amounts of less than about 500 ppm.

In addition, the gypsum composition optionally can include a starch, such as a pregelatinized starch or an acid-modified starch. The inclusion of the pregelatinized starch increases the strength of the set and dried gypsum cast and minimizes or avoids the risk of paper delamination in wallboard under conditions of increased moisture (e.g., with regard to elevated ratios of water to calcined gypsum). In cast gypsum products, starch improves the product surface hardness. One of ordinary skill in the art will appreciate methods of pregelatinizing raw starch, such as, for example, cooking raw starch in water at temperatures of at least about 185° F. (85° C.) or other methods. Suitable examples of pregelatinized starch include, but are not limited to, PCF 1000 starch, commercially available from Lauhoff Grain Company and AMERIKOR 818 and HQM PREGEL starches, both commercially available from Archer Daniels Midland Company. If included, the pregelatinized starch is present in any suitable amount. For example, if included, the pregelatinized starch can be added to the mixture used to form the set gypsum composition such that it is present in an amount of from about 0.5% to about 10% percent by weight of the set gypsum composition. Starches such as USG95 (United States Gypsum Company, Chicago, Ill.) are also optionally added for core strength.

A number of dispersants are useful in this invention. Polycarboxlate dispersants are a preferred type of dispersants. More preferred are polycarboxylic ether dispersants. When used in gypsum panels and other slurries high in stucco content, polycarboxylic ether dispersants that are the least effective for fluidzing the slurry alone, in many cases, are most responsive to modifiers.

One of the preferred class of dispersants used in the slurry includes two repeating units. It is described further in co-pending U.S. Ser. No. 11/152,418, filed Jun. 14, 2005, entitled "Gypsum Products Utilizing a Two-Repeating Unit Dispersant and Process for Making Them" and U.S. Ser. No. 11/449,924, filed concurrently herewith, entitled "Gypsum Products Utilizing a Two-Repeating Unit Dispersant and Process for Making Them", both previously incorporated by reference. These dispersants are products of Degussa Construction Polymers, GmbH (Trostberg Germany) and are supplied by Degussa Corp. (Kennesaw, Ga.) (hereafter "Degussa"), and are hereafter referenced as the "PCE211-Type Dispersants".

The first repeating unit is an olefinic unsaturated mono-carboxylic acid repeating unit, an ester or salt thereof, or an olefinic unsaturated sulphuric acid repeating unit or a salt thereof. Preferred repeating units include acrylic acid or methacrylic acid. Mono- or divalent salts are suitable in place of the hydrogen of the acid group. The hydrogen can also be replaced by hydrocarbon group to form the ester.

The second repeating unit satisfies Formula I,

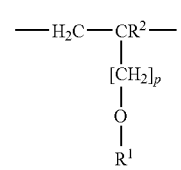

where $R^1$ is an alkenyl group of Formula I

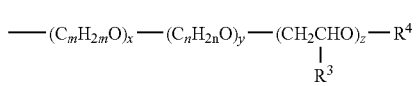

Referring to Formula I, the alkenyl repeating unit optionally includes a $C_1$ to $C_3$ alkyl group between the polymer backbone and the ether linkage. The value of p is an integer from 0-3, inclusive. Preferably, p is either 0 or 1. $R_2$ is either a hydrogen atom or an aliphatic $C_1$ to $C_5$ hydrocarbon group, which may be linear, branched, saturated or unsaturated.

The polyether group of Formula II contains multiple $C_2$-$C_4$ alkyl groups, including at least two different alkyl groups, connected by oxygen atoms. In the formula, m and n are integers from 2 to 4, inclusive, preferably, at least one of m and n is 2. Also x and y are integers from 55 to 350, inclusive. The value of z is from 0 to 200, inclusive. $R^3$ is a non-substituted or substituted aryl group and preferably phenyl. $R^4$ is hydrogen or an aliphatic $C_1$ to $C_{20}$ hydrocarbon group, a cycloaliphatic $C_5$ to $C_8$ hydrocarbon group, a substituted $C_6$ to $C_{14}$ aryl group or a group conforming at least one of Formula III(a), III(b) and III(c),

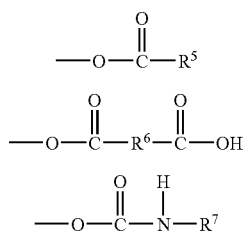

In the above formulas, $R^5$ and $R^7$, independently of each other, represent an alkyl, aryl, aralkyl or alkylaryl group. $R^6$ is a bivalent alkyl, aryl, aralkyl or alkylaryl group.

A particularly useful dispersant of the PCE211-Type Dispersants is designated PCE211 (hereafter "211"). Other polymers in this series known to be useful in the gypsum panel include PCE111.

The molecular weight of the PCE211-Type Dispersant is preferably from about 20,000 to about 60,000 Daltons. Surprisingly, it has been found that the lower molecular weight dispersants cause less retardation of set time than dispersants having a molecular weight greater than 60,000 Daltons. Generally, longer side chain lengths, which results in an increase in overall molecular weight, provides better dispersibility. However, tests with gypsum indicate that efficacy of the dispersant is reduced at molecular weights above 60,000 Daltons.

Another class of polycarboxylate compounds that are useful in this invention is disclosed in U.S. Pat. No. 6,777,517, herein incorporated by reference and hereafter referenced as the "2641-Type Dispersant". Use of the 2641-Type dispersants in gypsum slurries and wallboard is further described in U.S. Ser. No. 11/152,661, entitled, "Fast Drying Gypsum Products", previously incorporated by reference.

Preferably, the 2641-Type dispersant includes at least three repeating units shown in Formula IV(a), IV(b) and IV(c).

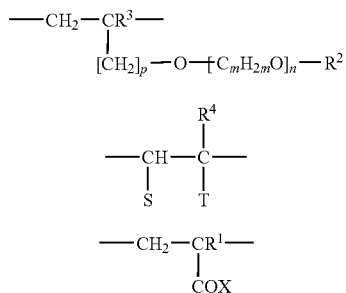

In this case, both acrylic and maleic acid repeating units are present, yielding a higher ratio of acid groups to vinyl ether groups. $R^1$ represents a hydrogen atom or an aliphatic hydrocarbon radical having from 1 to 20 carbon atoms. X represents OM, where M is a hydrogen atom, a monovalent metal cation, an ammonium ion or an organic amine radical. $R^2$ can be hydrogen, an aliphatic hydrocarbon radical having from 1 to 20 carbon atoms, a cycloaliphatic hydrocarbon radical having from 6 to 14 carbon atoms, which may be substituted. $R^3$ is hydrogen or an aliphatic hydrocarbon radical having from 1 to 5 carbon atoms, which are optionally linear or branched, saturated or unsaturated. $R^4$ is hydrogen or a methyl group, depending on whether the structural units are acrylic or methacrylic. It is contemplated that p can be from 0 to 3, that m is an integer from 2 to 4, inclusive, and n is an integer from 0 to 200, inclusive. Some preferred 2641-Type Dispersants are sold by Degussa as MELFLUX 2641F, MELFLUX 2651F and MELFLUX 2500L dispersants. (MELFLUX is a registered trademark of Degussa Construction Polymers, GmbH, Tröstberg, Germany).

Yet another preferred dispersant family is sold by Degussa and referenced as "1641-Type Dispersants". This dispersant is described in U.S. Pat. No. 5,798,425, herein incorporated by reference. A particularly preferred 1641-Type Dispersant is shown in Formula V and marketed as MELFLUX 1641F dispersant by Degussa. This dispersant is made primarily of two repeating units, one a vinyl ether and the other a vinyl ester. An example of a 1641-Type Dispersant, shown in Formula V, m and n are the mole ratios of the component repeating units, which can be randomly positioned along the polymer chain.

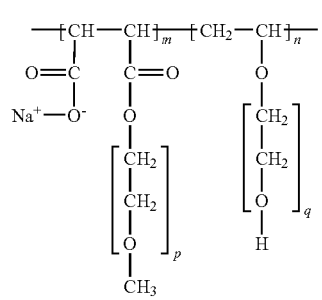

These dispersants are particularly well-suited for use with gypsum. While not wishing to be bound by theory, it is believed that the acid repeating units bind to the gypsum crystals while the long polyether chains of the second repeating unit perform the dispersing function. Since it is less retardive than other dispersants, it is less disruptive to the manufacturing process of gypsum products such as the gypsum panel. The dispersant is used in any effective amount. To a large extent, the amount of dispersant selected is dependent on the desired fluidity of the slurry. As the amount of water decreases, more dispersant is required to maintain constant slurry fluidity. Since polycarboxylate dispersants are relatively expensive components, it is preferred to use a small dose, preferably less than 2% or more preferably less than 1% by weight based on the dry weight of the gypsum. Preferably, the dispersant is used in amounts of about 0.05% to about 0.5% based on the dry weight of the stucco. More preferably, the dispersant is used in amounts of about 0.05% to about 0.2% on the same basis. In measuring a liquid dispersant, only the polymer solids are considered in calculating the dosage of the dispersant, and the water from the dispersant is considered when a water/stucco ratio is calculated.

Many polymers can be made with the same repeating units using different distributions of them. The ratio of the acid-containing repeating units to the polyether-containing repeating unit is directly related to the charge density. Preferably, the charge density of the co-polymer is in the range of about 300 to about 3000 µequiv. charges/g co-polymer. It has been found that the most effective dispersant tested for water reduction in this class of dispersants, MELFLUX 2651F, has the highest charge density.

However, it has also been discovered that the increase in charge density further results in an increase in the retardive effect of the dispersant. Dispersants with a low charge density, such as MELELUX 2500L, retard the set times less than the MELELUX 2651F dispersant having a high charge density. Since retardation in set times increases with the increase in efficacy obtained with dispersants of high charge density, making a slurry with low water, good flowability and reasonable set times requires keeping of-the charge density in a mid-range. More preferably, the charge density of the co-polymer is in the range of about 600 to about 2000 μequiv. charges/g co-polymer.

Also, the gypsum slurry optionally includes one or more modifiers that enhance the action of the polycarboxylate dispersant. The two-repeating unit dispersant used here is particularly susceptible to the effects of the modifiers. Preferred modifiers include cement, lime; also known as quicklime or calcium oxide; slaked lime, also known as calcium hydroxides; soda ash, also known as sodium carbonate; potassium carbonate, also known as potash; and other carbonates, silicates, hydroxides, phosphonates and phosphates. When modifiers are used, the efficacy of the dispersant is boosted to achieve a new level of fluidity, or the amount of polycarboxylate dispersant can be decreased to reduce the polycarboxylate expense. Additional information on modifiers and their use is found in U.S. Ser. No. 11/152,317 entitled "Modifiers For Polycarboxylate Dispersants" filed concurrently herewith and previously incorporated by reference.

The modifiers are used in the gypsum slurry in any suitable amount. Preferably, the modifiers are used in amounts from about 0.01% to about 2% by weight based on the dry stucco. More preferably, the modifiers are used in amounts of about 0.03% to about 0.5% and even more preferably, from about 0.05% to about 0.5%.

Water is added to the slurry in any amount that makes a flowable slurry. The amount of water to be used varies greatly according to the application with which it is being used, the exact dispersant being used, the properties of the stucco and the additives being used. The water to stucco ratio ("WSR") is preferably about 0.1 to about 0.8 based on the dry weight of the stucco. Commonly a WSR of about 0.2 to about 0.6 is preferred. Flooring compositions preferably use a WSR from about 0.17 to about 0.45, preferably from about 0.17 to about 0.34. Moldable or castable products preferably use water in a WSR of from about 0.1 to about 0.3, preferably from about 0.16 to about 0.25. The WSR can be reduced to 0.1 or less in laboratory tests based on the moderate addition of the PCE211-Type dispersants.

Water used to make the slurry should be as pure as practicable for best control of the properties of both the slurry and the set plaster. Salts and organic compounds are well known to modify the set time of the slurry, varying widely from accelerators to set inhibitors. Some impurities lead to irregularities in the structure as the interlocking matrix of dihydrate crystals forms, reducing the strength of the set product. Product strength and consistency is thus enhanced by the use of water that is as contaminant-free as practicable.

In a preferred wallboard operation, the gypsum is moved on a conveyor toward a mixer. Prior to entry into the mixer, dry additives, such as defoamers, or set accelerators, are added to the powdered gypsum. Some additives are added directly to the mixer via a separate line. Trimetaphosphate was added using this method in the examples described below. Other additives may also be added to the water. This is particularly convenient where the additives are in liquid form. For most additives, there is no criticality regarding placing the additives in the slurry, and they may be added using whatever equipment or method is convenient.

However, when using the dispersant of this invention, it is important to add the dispersant to the water prior to addition of the stucco. Gauge water or make-up water is added at the mixer at a rate needed to meet the target water to stucco ratio when water from other sources has been taken into account.

Other known additives may be used as needed to modify specific properties of the product, such as wallboard, flooring or cast products. Sugars, such as dextrose, are used to improve the paper bond at the ends of the boards. Wax emulsions or polysiloxanes are used for water resistance. If stiffness is needed, boric acid is commonly added. Fire retardancy can be improved by the addition of vermiculite and/or glass fiber. These and other known additives are useful in the present slurry and gypsum panel formulations.

Unless otherwise noted in the examples that follow, a 400 gram sample was prepared based on the dry components. All dry components, including aggregate, were weighed and dry blended together. The predetermined amount of deionized water was measured and poured into a mixing bowl. The dry blended material was added to the water and the time noted as the starting point to determine the set time. The mixing bowl was placed onto a Hobart mixer and jogged for approximately five seconds. After one minute of soaking, the material was mixed at low speed for two minutes. The bowl was removed from the mixer and the contents stirred for about 15 seconds with a wisk to assure that all material was evenly mixed.

The initial slump sample was poured into a damp 2"×4" (5 cm×1 cm) cylinder placed on a plastic sheet, slightly overfilling the cylinder. Excess material was screeded from the top, then the cylinder was lifted up smoothly, allowing the slurry to flow out the bottom, making the patty. The patty was measured (±⅛") in two directions 90° apart, and the average reported as the patty diameter.

References to set time refer to Vicat set time per ASTM C-472, herein incorporated by reference. The Vicat set time started from the time the plaster was added to the water for hand mixes and from the time the slurry came off the mixer for machine mixes. A sample was made up of 50 grams of dry, aggregate-free material and sufficient water to make a normal consistency for the desired application. The sample was poured onto an acrylic sheet to form a patty. A 300 gram Vicat needle was held half way between the center and the outer edge of the patty, perpendicular to the patty surface. The needle was held to the patty surface and released to fall freely of it's own weight. Set time was determined when the needle failed to penetrate to the bottom of the patty. If the degree of penetration was unclear, the needle was given a little push to determine if it had touched the underlying surface.

EXAMPLE I

This example demonstrates the importance of the order of addition of the modifier and the dispersant. Four hundred grams of stucco from Southard, Okla., 220 g of water, 0.7 g of HRA set accelerator and 0.89% of MELFLUX 2500L dispersant that includes 45% solids were used in each of the following tests, Additionally, 0.6 g of soda ash was added to two of the samples as described below. The water and dispersant were added to the water prior to the addition of the stucco and modifier (if present) in all cases. After addition of the stucco, the mixture was allowed to soak for 15 seconds, then mixed for 30 seconds to form a slurry. The modifier was added as described below.

Condition 1 was the control sample, to which no soda ash modifier was added. In Condition 2, soda ash was added to the mixing water prior to stucco addition to the water. The soda ash was added after the stucco was added to the mixing water in Condition 3, just prior to turning on the mixer after the soak time.

Patty size, stiffening rate and Vicat Set times are reported in Table I for each of the three process conditions.

TABLE I

| Condition | 1 | 2 | 3 |
|---|---|---|---|
| Patty Size | 19.5 cm | 27 cm | 24.8 cm |
| Stiffening Rate | 2:10 | 5:50 | 5:10 |
| Vicat Set | 6:10 | 10:00 | 9:30 |

Conditions 2 and 3 clearly show that better fluidity is obtained when the modifier and dispersant are both added, compared to no modifier addition. However, Condition 3, where the modifier is added to the slurry of contact each other prior to introduction of the stucco.

EXAMPLE 2

In this comparative example, lime was added to a gypsum slurry used to make gypsum panels and resulted in little improvement in fluidity. All component amounts are expressed as pounds per 1000 square feet (104m$^2$) of gypsum panel ("lbs/MSF"). Twelve hundred eighty five pounds of stucco was combined with other dry components, including three pounds of starch, three pounds of cerelose, and 0.32 pounds (145 g) of retarder. Ivory lime was premixed with water and added directly to the mixer through one of several water injection orifices adjacent to the stucco inlet, The dispersant, Melflux 2500L, was added directly to the gauge water and blended until homogeneous, and the mixture was then added to the mixer through the remaining water injection orifices adjacent to the stucco inlet. The dry components were blended with the stucco, which was then added to the mixer through the stucco downspout.

TABLE II

| Sample | With 0.18% Lime | No Lime |
|---|---|---|
| HRA Accelerator | 32 lbs/MSF | 38.8 lbs/MSF |
| Water | 831 | 855 |
| WSR | 0.65 | 0.67 |

As shown in Table II, the use of 0.18% lime in this process allowed a modest reduction in water. However, the water reduction was not nearly as large as was indicated in laboratory tests,. It is believed that because the modifier was added in such a way that it was not well dispersed in the stucco before the PCE was, the interaction between the modifier and the dispersant was limited.

EXAMPLE 3

A plant trial was held whereby the dispersant and the modifier were both dissolved in the gauging water. The modifier and soda ash were dissolved in water to make a 10% solution by weight. 3.9 lbs/msf of Melflux 2500L, diluted to 32% solids, was added to the gauging water. Then 11.3 lb/msf of the soda ash slurry was added to the gauging water, and all components were mixed to form a homogeneous solution. Twelve hundred fifty-seven pounds of stucco was added to the mixer to form the gypsum slurry.

TABLE III

| Sample | With 0.1% Soda Ash | No Soda Ash |
|---|---|---|
| HRA Accelerator | 35 lbs/MSF | 29 lbs/MSF |
| Potassium Sulfate | 0 lbs/MSF | 4 lbs/MSF |
| Water | 861 | 965 |
| WSR | 0.69 | 0.77 |

As shown in Table III, the use of 0.1% soda ash in this process allowed a significant reduction in water.

While particular embodiments of the method for making a slurry of gypsum, modifiers, dispersants and water has been shown and described, it will be appreciated by those skilled in the art that changes and modifications may be made thereto, without departing from the invention in its broader aspects and as set forth in the following claims.

What is claimed is:

1. A method of making a gypsum slurry comprising:
   obtaining an amount of dry components comprising stucco,
   predissolving a modifier and a polycarboxylate dispersant in water to form a solution, said modifier acting to increase the efficacy of the dispersant and
   mixing the solution and the dry components to form a gypsum slurry having sufficient fluidity to pour easily.

2. The method of claim 1 wherein the modifier in said predissolving step comprises at least one of the group consisting of lime, quicklime, a silicate, a phosphate, a phosphonate and a carbonate.

3. The method of claim 2 wherein the modifier comprises at least one of the group consisting of sodium carbonate, potassium carbonate, calcium oxide and sodium silicate.

4. The method of claim 1 wherein said predissolving step comprises adding the modifier and the dispersant to the water simultaneously.

5. The method of claim 1 wherein the modifier is added to the water before the dispersant in said predissolving step.

6. The method of claim 1 wherein the dispersant in said predissolving step comprises vinyl ether repeating units.

7. The method of claim 1 wherein said predissolving step further comprises combining the modifier with a portion of the water to form a modifier slurry, prior to predissolving the modifier slurry and dispersant in the remaining portion of water.

8. The method of claim 1 wherein the dry components comprise at least 50% stucco by weight.

9. A method of making a gypsum product comprising:
   obtaining an amount of dry components comprising stucco,
   predissolving a modifier and a polycarboxylate dispersant into water to form a solution, wherein said modifier acts to increase the efficacy of the dispersant,
   mixing the solution and the dry components to form a gypsum slurry,
   shaping the gypsum slurry into a product, and
   allowing the slurry to set.

10. The method of claim 9 further comprising drying the product in a kiln.

11. The method of claim 9 wherein the dry components comprise at least 50% stucco by weight.

12. The method of claim 9 wherein the product is a gypsum panel.

13. The method of claim 12 wherein said shaping step further comprises sandwiching the slurry between two pieces of facing material.

14. The method of claim 12 wherein the dispersant comprises an acrylic repeating unit and a vinyl ether repeating unit.

15. The method of claim 9 wherein the dispersant comprises a polycarboxylic ether.

16. The method of claim 9 wherein the dry components further comprise at least one selected from the group consisting of strength enhancers, set accelerators, set retarders, starch, fibers and biocides.

17. A method of making a gypsum slurry comprising:
selecting a polycarboxylate dispersant, a modifier, wherein said modifier acts to increase the efficacy of the dispersant and a hydraulic material comprising stucco; and
combining the polycarboxylate dispersant, the modifier, the hydraulic material and water together to form a slurry, wherein the modifier is added to at least one of the water, stucco and dispersant prior to formation of the slurry phase by the water, the stucco and the dispersant.

18. The method of claim 17 wherein the dispersant is in a dry form and said combining step further comprises predissolving the modifier in the water, adding the dispersant to the stucco to make a stucco-dispersant mixture, then adding the stucco-dispersant mixture to the predissolved modifier-water mixture.

* * * * *